United States Patent Office.

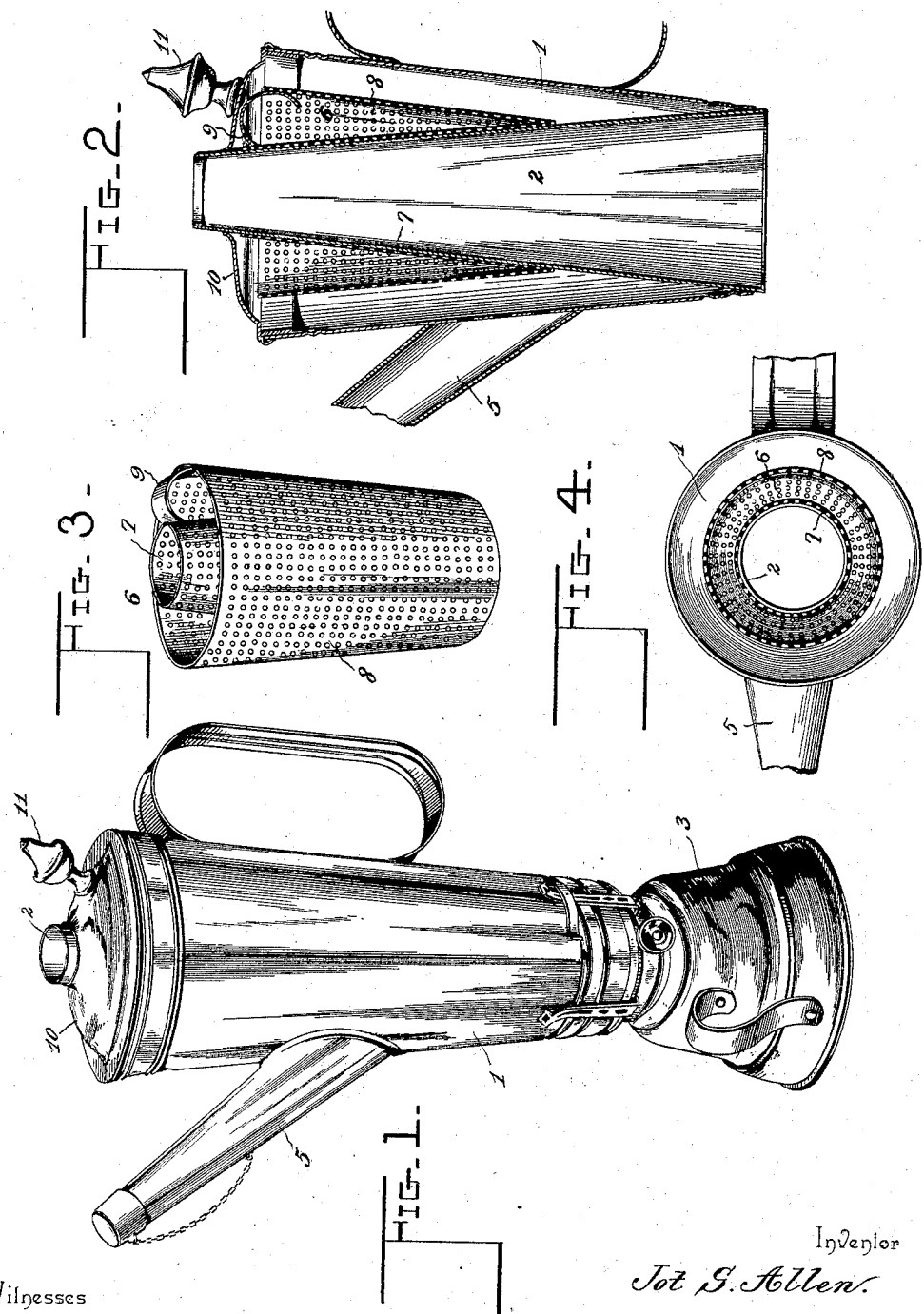

JOT S. ALLEN, OF GAINESVILLE, GEORGIA, ASSIGNOR OF ONE-FIFTH TO M. M. HAM, OF SAME PLACE.

COFFEE OR TEA POT.

SPECIFICATION forming part of Letters Patent No. 609,073, dated August 16, 1898.

Application filed December 31, 1897. Serial No. 664,940. (No model.)

*To all whom it may concern:*

Be it known that I, JOT S. ALLEN, a citizen of the United States, residing at Gainesville, in the county of Hall and State of Georgia, have invented a new and useful Coffee or Tea Pot, of which the following is a specification.

The invention relates to improvements in coffee and tea pots.

The object of the present invention is to improve the construction of coffee and tea pots and to provide a simple, inexpensive, and efficient one adapted to be arranged over a lamp to enable the latter to be employed for furnishing the necessary heat and capable of enabling water to be rapidly boiled, so that coffee and tea may be made quickly.

Another object of the invention is to enable coffee and tea to be thoroughly subjected to the action of boiling water for the desired length of time and to prevent the grounds and leaves from being mixed with the water, so that they may be readily withdrawn from the pot when desired.

The invention consists in the construction and novel combination and arrangement of parts, as hereinafter fully described, illustrated in the accompanying drawings, and pointed out in the claim hereto appended.

In the drawings, Figure 1 is a perspective view of a coffee and tea pot constructed in accordance with this invention and shown applied to a lamp. Fig. 2 is a vertical sectional view of the coffee and tea pot. Fig. 3 is a detail perspective view of the strainer or percolator. Fig. 4 is a horizontal sectional view of the coffee and tea pot.

Like numerals of reference designate corresponding parts in all the figures of the drawings.

1 designates a coffee and tea pot comprising an outer inverted truncated conical shell and an inner conical shell 2, united at its base with the lower end of the outer shell or casing and tapering to its upper end, which is extended a short distance above the outer shell; but instead of constructing the outer shell conical, as illustrated in the accompanying drawings, it may be made cylindrical. The space between the inner and outer shells receives the water, and the inner shell constitutes a flue, the device being adapted to be mounted upon a lamp 3, as illustrated in Fig. 1 of the accompanying drawings. The resilient arms of the lamp are adapted to embrace the lower portion of the coffee and tea pot similar to a chimney, and they are received within horizontal arms or keepers mounted on the exterior of the pot; but other fastening devices may be employed for securing the device upon a lamp or analogous heater.

The coffee and tea pot, which is also adapted to be employed as a boiler, is provided at one side with a handle and at the opposite side with a spout 5, which may be normally closed at its outer end by a suitable cap or plug.

Within the coffee or tea pot is arranged a tapering strainer or percolator adapted to receive coffee or tea and consisting of an inner conical portion 7 and an outer portion 8, both constructed of suitable foraminous material, such as wire-gauze or finely-perforated sheet metal. The outer portion of wall 8, which may be inverted trunco-conical similar to the outer shell of the coffee-pot, as shown in the accompanying drawings, can also be made cylindrical, if desired. The inner portion of the strainer fits the inner shell or lining of the coffee-pot and is extended above the upper edges of the outer shell of the pot and the outer portion 8 of the strainer or percolator, and the inner and outer walls or portions of the strainer or percolator are supported and braced by a handle 9, which connects their upper edges. The outer walls of the percolator and the pot are arranged in substantially the same horizontal plane.

The pot is provided with a cover or lid 10, having a central opening to receive the extended portion of the inner wall or shell 2, and provided with an eccentrically-arranged handle 11, which may be readily grasped to remove the lid without the hand of the operator being placed directly over the flue of the pot. The lid forms practically a closure for the strainer or percolator, and there is no liability of coffee-grounds or tea-leaves escaping from the same.

The invention has the following advantages: The coffee and tea pot is simple and comparatively inexpensive in construction and is adapted to be employed as a boiler. It is capable of quickly heating water to the desired temperature, and while it enables coffee and tea to be thoroughly subjected to the action of hot water, yet it prevents them from escaping from the pot when the contents thereof are decanted. Also the strainer or percolator is adapted to be readily removed from the pot after its contents have been thoroughly subjected to the action of the boiling water.

Changes in the form, proportion, and minor details of construction may be resorted to without departing from the spirit or sacrificing any of the advantages of this invention, such as constructing the outer walls of the percolator and the coffee or tea pot either conical or cylindrical.

What I claim is—

In a device of the class described, the combination of a pot comprising inner and outer shells united at the bottom, the inner shell being conical and extending above the outer shell and forming a flue, a strainer or percolator comprising inner and outer foraminous walls, the outer wall having its upper edge arranged in substantially the same horizontal plane as the upper edge of the outer wall of the pot, the handle arranged at the top of the device and secured to the inner and outer walls of the strainer or percolator and connecting the same near their upper edges, said handle also forming a brace for supporting the strainer or percolator, and a lid arranged on the pot and provided with a central opening for the extended portion of the inner shell, said lid also serving as a closure for the strainer or percolator, substantially as described.

In testimony that I claim the foregoing as my own I have hereto affixed my signature in the presence of two witnesses.

JOT S. ALLEN.

Witnesses:
  A. M. MILLER,
  A. R. SMITH.